June 10, 1947.  W. B. INGHAM  2,421,789
ANCHOR CHAIN LINK
Filed Nov. 29, 1945  2 Sheets-Sheet 1
Fig.1.
Fig.2.
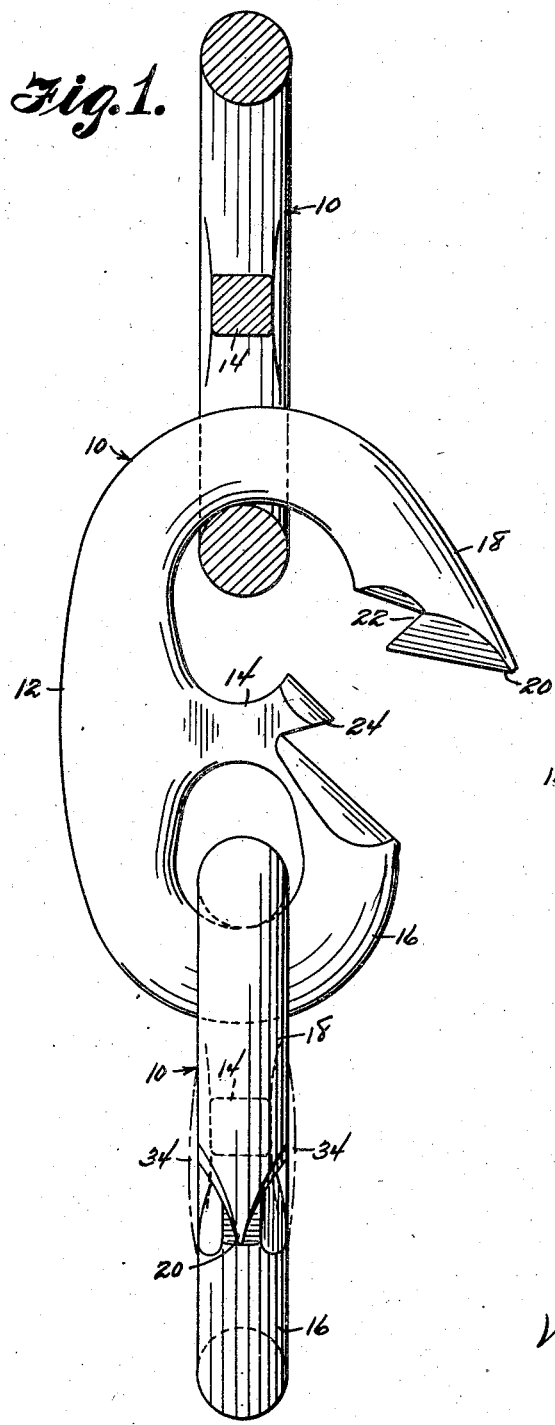
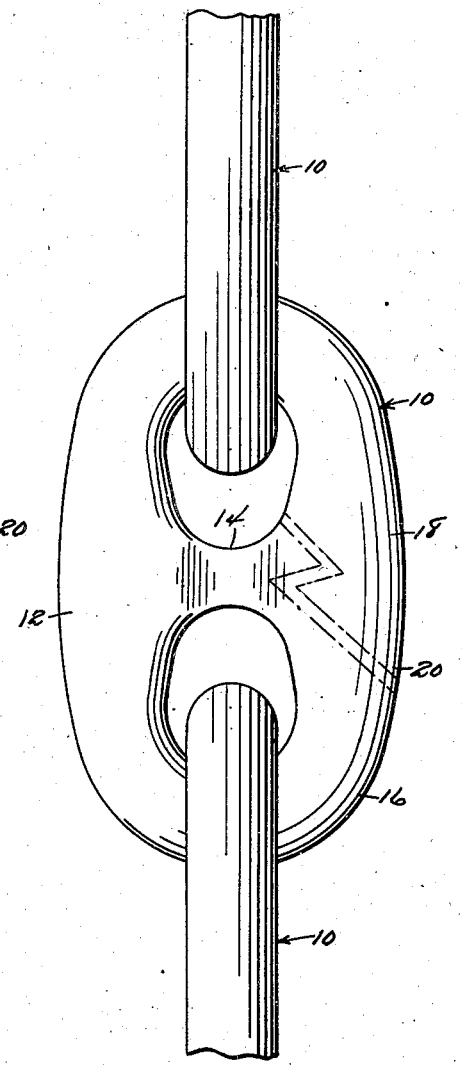
INVENTOR.
William B. Ingham
BY Victor J. Evans & Co.
ATTORNEYS June 10, 1947.    W. B. INGHAM    2,421,789
ANCHOR CHAIN LINK
Filed Nov. 29, 1945    2 Sheets-Sheet 2

INVENTOR.
William B. Ingham
BY Victor J. Evans & Co.
ATTORNEYS

Patented June 10, 1947

2,421,789

UNITED STATES PATENT OFFICE 2,421,789

ANCHOR CHAIN LINK

William B. Ingham, Maynard, Mass.

Application November 29, 1945, Serial No. 631,523

5 Claims. (Cl. 59—35)

This invention relates to an anchor chain link which is formed in the shape of a loop having free ends which are locked and welded together.

An object of this invention is to provide a link having specifically formed locking means which when joined together and welded will produce a link that is strong and durable.

Another object of the invention is to provide a link from which a chain of any length may be assembled from a series of such links.

With the above and other objects and advantages in view, the invention consists of the novel details of construction, arrangement and combination of parts more fully hereinafter described, claimed and illustrated in the accompanying drawings, in which:

Figure 1 is an elevational view of a blank embodying the invention in assembling position;

Figure 2 is the same after the free ends have been bent into contact with each other;

Figure 3:
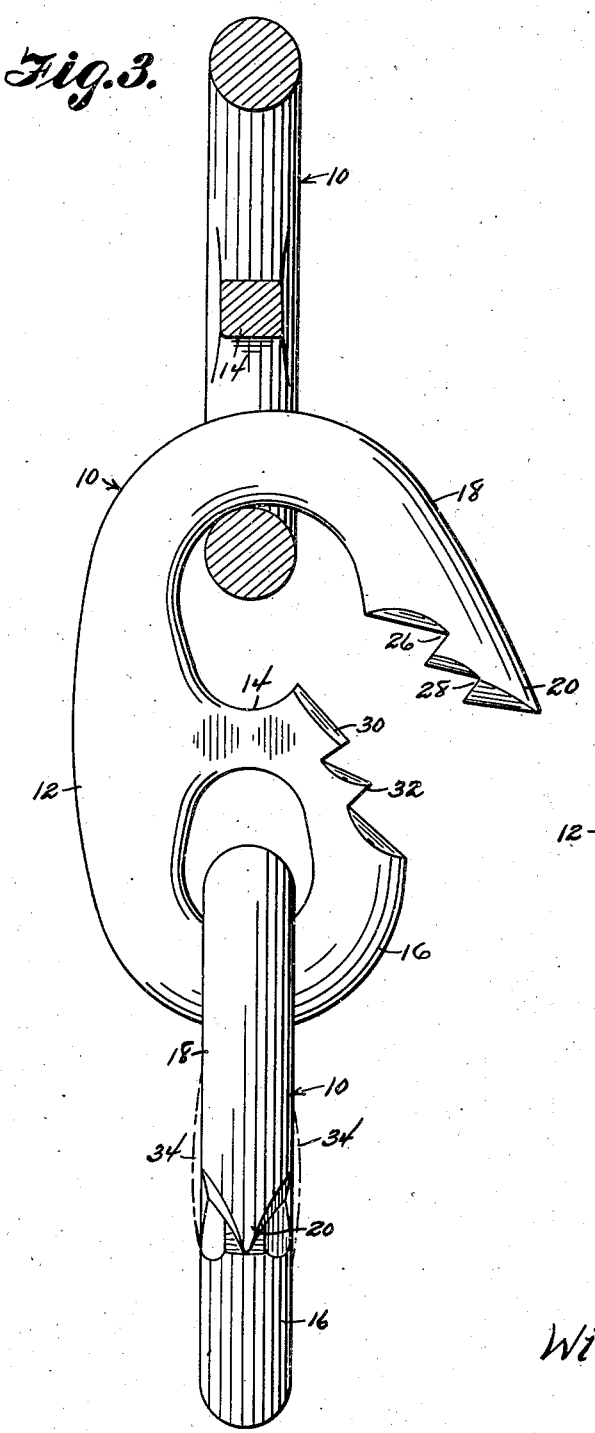
Figure 3 is a modified form of the invention in assembling position.

Referring more in detail to the drawing, the numeral 10 designates an open sided link having a solid side 12, a center stud 14 integral therewith and the closed loop portion 16.

The free arm 18 of the link 10 is provided with a chamfered locking end 20 which, as shown, has the socket 22 to receive the chamfered tooth 24 formed on and as part of the center stud 14.

Figure 4:
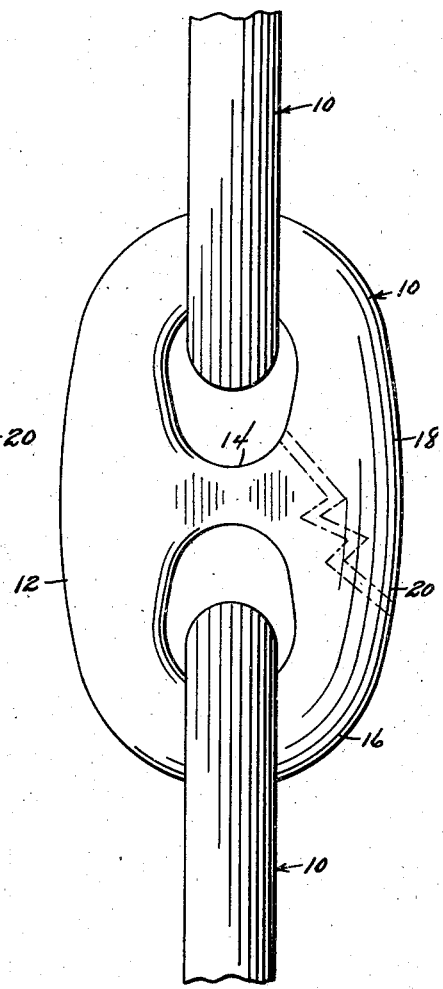
Figure 4 is the same in assembled position.

In Figures 3 and 4, the arm 18 is provided with two chamfered sockets 26 and 28, respectively, which are adapted to receive the two chamfered teeth 30 and 32 formed on the stud 14 and loop 16.

The link 10 is forged in a drop hammer in a position as shown in Figures 1 and 3, and trimmed of flash, and while the link is still hot, the open end or arm 18 is inserted in the loop 16 of another link of some forged design and the open end is closed by pressure either by power press or by lever so that all contact points and areas are almost touching. After assembling chains in this manner, to the required length, the free arm 18 is welded to the remainder of the link, as shown in Figures 1 and 3 at 34.

The chain will then be re-heated and put through another hammer with dies, having an impression of the link, when closed, each link will then be struck one blow of the hammer to bring the welded area to uniform size of the link and to eliminate any pops or blow holes that might be in the welded joint, then heat treated and hardened.

Thus, a link is formed that permits easier and faster assembling of chains of any desired length.

It is believed that the link and the manner in which the chain is formed from a series of these links will be apparent to those skilled in the art and it is to be understood that minor changes in the details of the construction of the link and the manner of forming the chain may be resorted to without departing from the spirit of the invention and the scope of the appended claims.

Having thus described the invention, what is claimed as new and desired to be secured by Letters Patent is:

1. The method of making a chain, comprising the steps of forming a blank, having a solid side, and a free arm and a solid loop having a chamfered joint inserting said free arm in the solid loop of a similar blank, bringing the free arm into close relation to said solid loop and welding the same, re-heating the chain and forging the welded area in a die, having the same counter as said link, and then cleaning any flash therefrom to form a continuous chain of any desired length.

2. A device of the character described, comprising a link having a solid side, a central stud formed integral with said side, a solid loop portion, a free arm and a chamfered joint formed on said stud and said free arm.

3. The invention as in claim 2, wherein said chamfered joint comprises a socket and teeth conforming to said socket.

4. The invention as in claim 2, wherein said chamfered joint comprises a plurality of sockets and teeth conforming to said sockets.

5. The invention as in claim 2, wherein said joint is secured by welding.

WILLIAM B. INGHAM.